United States Patent
White et al.

(10) Patent No.: US 7,689,948 B1
(45) Date of Patent: Mar. 30, 2010

(54) SYSTEM AND METHOD FOR MODEL-BASED SCORING AND YIELD PREDICTION

(75) Inventors: David White, San Jose, CA (US); Roland Ruehl, San Carlos, CA (US); Mathew Koshy, San Mateo, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 290 days.

(21) Appl. No.: 11/678,593

(22) Filed: Feb. 24, 2007

(51) Int. Cl.
G06F 17/50 (2006.01)
G06F 19/00 (2006.01)
G01R 31/02 (2006.01)
G06F 11/00 (2006.01)

(52) U.S. Cl. .................... 716/4; 700/110; 324/537; 703/14; 702/59; 714/25; 382/149

(58) Field of Classification Search .............. 716/4; 700/110; 324/537; 703/14; 702/59; 714/25; 382/149
See application file for complete search history.

(56) References Cited

U.S. PATENT DOCUMENTS

| | | | |
|---|---|---|---|
| 5,335,191 A | 8/1994 | Kundert et al. | |
| 5,559,718 A | 9/1996 | Baisuck et al. | |
| 5,654,898 A | 8/1997 | Roetcisoender et al. | |
| 5,729,466 A * | 3/1998 | Bamji | 716/10 |
| 5,862,055 A * | 1/1999 | Chen et al. | 700/121 |
| 5,966,459 A * | 10/1999 | Chen et al. | 382/149 |
| 6,035,244 A * | 3/2000 | Chen et al. | 700/110 |
| 6,066,179 A * | 5/2000 | Allan | 716/4 |
| 6,088,523 A | 7/2000 | Nabors et al. | |
| 6,151,698 A | 11/2000 | Telichevesky et al. | |
| 6,393,602 B1 * | 5/2002 | Atchison et al. | 716/4 |
| 6,470,489 B1 | 10/2002 | Chang et al. | |
| 6,493,849 B1 | 12/2002 | Telichevesky et al. | |
| 6,636,839 B1 | 10/2003 | Telichevesky et al. | |
| 6,751,785 B1 | 6/2004 | Oh | |
| 6,904,581 B1 | 6/2005 | Oh | |

(Continued)

OTHER PUBLICATIONS

Barnett et al., "Yield-Reliability Modeling: Experimental Verification and Application to Burn-in Reduction", Proceedings of 20th IEEE VLSI Test Symposium, 2002, pp. 75-80.*

(Continued)

Primary Examiner—Phallaka Kik
(74) Attorney, Agent, or Firm—Vista IP Law Group LLP

(57) ABSTRACT

Methods and systems for the integration of models and accurate predictions to score the circuit design, which translates to a more accurate and less complex yield prediction. In the present inventive approach, the computer-implemented methods and systems use at least one processor that is configured for performing at least predicting a physical realization of a layout design based at least in part on one or more model parameters, determining one or more hotspots associated with the layout design, determining a score for each of the one or more hotspots associated with the layout design, and categorizing the one or more hotspots according to at least the score in some embodiments. In some embodiments, the methods or the systems further use at least one processor for the act of determining one or more hotspots by using at least the design intent or the manufacturing information.

20 Claims, 6 Drawing Sheets

U.S. PATENT DOCUMENTS

| | | | |
|---|---|---|---|
| 6,921,672 B2* | 7/2005 | Satya et al. .................... | 438/18 |
| 6,996,797 B1 | 2/2006 | Leibmann et al. | |
| 7,194,704 B2 | 3/2007 | Kotani et al. | |
| 7,308,669 B2* | 12/2007 | Buehler et al. ................ | 716/13 |
| 7,325,206 B2 | 1/2008 | White et al. | |
| 7,353,475 B2 | 4/2008 | White et al. | |
| 7,356,783 B2 | 4/2008 | Smith et al. | |
| 7,360,179 B2 | 4/2008 | Smith et al. | |
| 7,363,099 B2 | 4/2008 | Smith et al. | |
| 7,363,598 B2 | 4/2008 | Smith et al. | |
| 7,367,008 B2 | 4/2008 | White et al. | |
| 7,380,220 B2 | 5/2008 | Smith et al. | |
| 7,383,521 B2 | 6/2008 | Smith et al. | |
| 7,386,815 B2* | 6/2008 | Bickford et al. ................ | 716/4 |
| 7,393,755 B2 | 7/2008 | Smith et al. | |
| 7,418,694 B2* | 8/2008 | Kobayashi et al. ............ | 716/21 |
| 7,453,261 B1* | 11/2008 | Mark ..................... | 324/158.1 |
| 7,503,020 B2* | 3/2009 | Allen et al. .................... | 716/2 |
| 7,592,827 B1* | 9/2009 | Brozek ....................... | 324/765 |
| 2005/0037522 A1 | 2/2005 | Smith et al. | |
| 2005/0051809 A1 | 3/2005 | Smith et al. | |
| 2005/0196964 A1 | 9/2005 | Smith et al. | |
| 2005/0235246 A1 | 10/2005 | Smith et al. | |
| 2005/0251771 A1 | 11/2005 | Robles | |
| 2005/0268256 A1 | 12/2005 | Tsai et al. | |
| 2005/0273739 A1* | 12/2005 | Tohyama ...................... | 716/4 |
| 2006/0123380 A1 | 6/2006 | Ikeuchi | |
| 2006/0265684 A1* | 11/2006 | Buehler et al. ................ | 716/12 |
| 2006/0273266 A1 | 12/2006 | Preil et al. | |
| 2007/0101305 A1 | 5/2007 | Smith et al. | |
| 2007/0133860 A1 | 6/2007 | Lin et al. | |
| 2007/0256039 A1 | 11/2007 | White et al. | |
| 2007/0294648 A1* | 12/2007 | Allen et al. .................... | 716/4 |
| 2008/0005704 A1 | 1/2008 | Miloslavsky et al. | |
| 2008/0027698 A1 | 1/2008 | White | |
| 2008/0148201 A1* | 6/2008 | Lanzerotti et al. ............. | 716/5 |
| 2008/0160646 A1 | 7/2008 | White et al. | |
| 2008/0162103 A1 | 7/2008 | White et al. | |
| 2008/0163139 A1 | 7/2008 | Scheffer et al. | |
| 2008/0163141 A1 | 7/2008 | Scheffer et al. | |
| 2008/0163148 A1 | 7/2008 | Scheffer et al. | |
| 2008/0163150 A1 | 7/2008 | White | |
| 2008/0189664 A1* | 8/2008 | Bickford et al. ................ | 716/4 |
| 2008/0195359 A1* | 8/2008 | Barker et al. .................... | 703/2 |
| 2008/0216027 A1 | 9/2008 | White et al. | |
| 2009/0031261 A1 | 1/2009 | Smith et al. | |
| 2009/0031271 A1 | 1/2009 | White et al. | |
| 2009/0100386 A1* | 4/2009 | Allen et al. .................... | 716/2 |

OTHER PUBLICATIONS

Wang et al., "Yield Modeling of Arbitrary Defect Outline", 8th International Conference on Solid-State and Integrated Circuit Technology, Oct. 23-26, 2006, pp. 1183-1185.*

Wagner et al., "An Interactive Yield Estimator as a VLSI CAD Tool", The IEEE International Workshop on Defect and Fault Tolerance in VLSI Systems, Oct. 27-29, 1993, pp. 167-174.*

Segal et al., "Critical Area Based Yield Prediction Using In-Line Defect Classification Information [DRAMs]", 2000 IEEE/SEMI Advanced Semiconductor Manufacturing Conference and Workshop, Sep. 12-14, 2000, pp. 83-88.*

Harris et al., "Estimates of Integrated Circuit Yield Components from In-Line Inspection Data and Post-Process Sort Data", IEEE/SEMI Advanced Semiconductor Manufacturing Conference, 1997, pp. 150-155.*

Duvivier et al., "Approximation of Critical Area of ICs With Simple Parameter Extracted from the Layout", 1995 IEEE International Conference Workshop on Defect and Fault Tolerance in VLSI Systems, Nov. 13-15, 1995, pp. 1-9.*

Notice of Allowance dated Jun. 11, 2009 for U.S. Appl. No. 11/678,594.

Notice of Allowance dated December 14, 2009 for U.S. Appl. No. 11/678,592.

Notice of Allowance dated January 8, 2010 for U.S. Appl. No. 11/678,594.

* cited by examiner

400

SYSTEM AND METHOD FOR MODEL-BASED SCORING AND YIELD PREDICTION

RELATED APPLICATION DATA

The present application is related to co-pending U.S. patent application Ser. No. 11/678,592, entitled "System and Method for Performing Verification Based Upon Both Rules and Models," filed on Feb. 24, 2007, and co-pending U.S. patent application Ser. No. 11/678,594, entitled "System and Method for Layout Optimization Using Model-Based Verification," filed on Feb. 24, 2007, which are hereby incorporated by reference in their entirety.

FIELD OF THE INVENTION

The invention relates to Integrated Circuit (chip) design.

BACKGROUND

Conventional approaches to performing yield estimates for a design are very cumbersome, employing many types and categories of redundant circuit parameters to provide rough estimates. For example, many different values and types of "width" parameters may be employed to derive estimates of yield for a given circuit for a fabrication facility. The as-designed parameters are then scored relative to these parameters to provide a yield estimate for the circuit design. Using this large number of parameters is basically a crutch because of the present inability to accurately predict the actual as-manufactured features of the product. As a result, the existing approach provides a layer of complexity and uncertainty that could affect the efficiency, effectiveness, and accuracy of any resulting yield estimates.

SUMMARY

Methods and systems for allowing an Integrated Circuit designer to predict the yield using model-based scoring.

In one implementation, a method and system for predicting yield using model based simulation. Yield is qualitatively determined via scoring functions. Scoring also utilizes models and is optionally based on design rules.

In another implementation, the scoring is based on criteria other than yield and may consider parametric information.

DETAILED DESCRIPTION

The invention is directed to the integration of models and accurate predictions to score the circuit design, which translates to a more accurate and less complex yield prediction. As mentioned, the prior approaches use multiple numbers/types of parameters to try and hopefully cover the different features that will result from manufacturing a circuit design. In the present inventive approach, this uncertainty is largely removed by using models and simulation to more accurately predict the as-manufactured features of the design. As a result, the process can eliminate the large number of redundant parameters, and go straight to using the anticipated feature parameters to score the design. Scoring functions, which account for the model-based approach, would then be used to calculate the anticipated yield.

Figure 1:
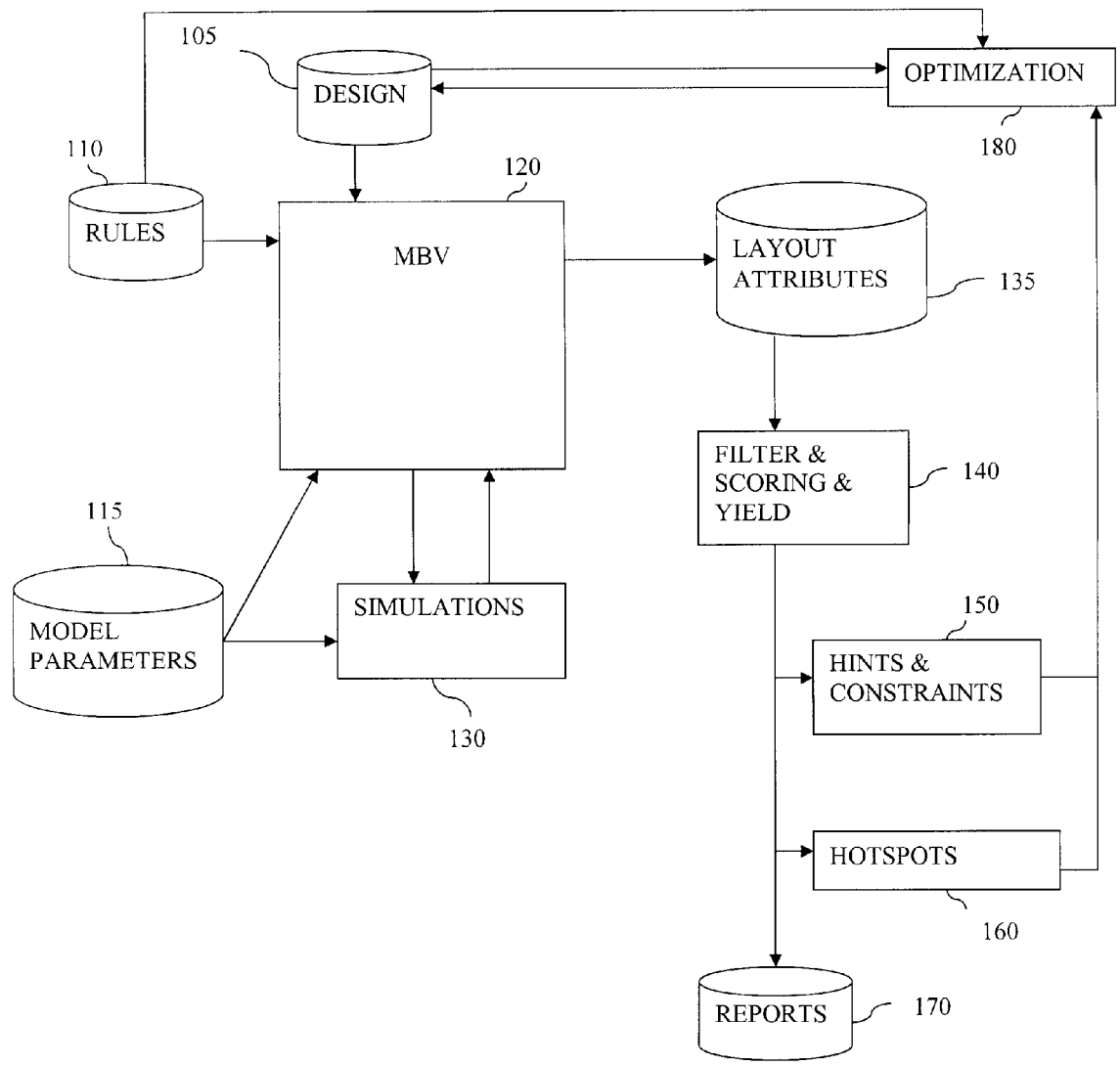
FIG. 1 depicts an architectural overview of an infrastructure for performing verification based upon both rules and models.

FIG. 1 depicts an architectural overview of an infrastructure for performing verification based upon both rules and models. The circuit design is simulated to represent the final as-manufactured features of the fabricated structures. The verification is performed by applying rules on the structures to better predict the hotspots.

The architectural overview 100 includes a model-based verification (MBV) tool 120 which performs simulations 130 using the design 105, which includes layout of the circuits specified by the designers. The MBV also accepts design rules as input. These rules are provided by the designers and/or manufacturers. In one embodiment, standard design rule check (DRC) rules are used. In another embodiment, model based rules are used. Any design rules may be used as desired by the designer. The MBV also accepts the model parameters 115 for performing the simulations 130. In one embodiment, the simulations are performed in software. In another embodiment, the simulation is performed in hardware. Any simulator may be used for simulation of the design. One approach for implementing the MBV and simulation process is described in co-pending U.S. patent application Ser. No. 11/678,592, entitled "System and Method for Performing Verification Based Upon Both Rules and Models," filed on Feb. 24, 2007, which is incorporated herein by reference in its entirety. The simulated design represents the as manufactured product having the design on wafer.

Rules 110 are used to determine possible hotspots and layout attributes 135. Hotspots are manufacturability violations detected either with DRC-type rules (for example for via analysis, simplified Lithography checks using width/spacing rules, simplified chemical mechanical planarization (CMP) checks using density rules, etc.) or with simulator invocations followed by DRC rules for manufacturability rule checking. For example, contours generated by a lithography simulation are checked for spacing violations. In one embodiment, hotspot is a marker/vertex, an edge, or a polygon. In another embodiment, it is stored together with information about yield loss cause, hierarchy information, and possibly information about its environment (shape patterns, connectivity information, etc).

In some embodiments, layout attributes include raw geometric violations and extraction results, such as via statistics, critical area, density information, etc. In other embodiments, layout attributes include or are related to electrical information such as net IDs.

The layout information from the layout attributes 135 and determined hotspots are filtered to determine a score and yield 140. Filtering may be important to the efficient function of the system because many hotspots (e.g., for a large design, millions) are generated on an "un-clean" design with a first run of MBV. To reduce the amount of hotspots to the most important hotspots, scoring utilities that classify hotspots based on importance and other characteristics are used. In one embodiment, the filtering process is user-controlled via an input deck. In another embodiment, these filters generate optimization hints for optimization. Hints are suggestions on the possible ways to try to optimize hotspots. Hints are generated by determining ways to improve the design of hotspots from analyzing rule violations and model-based simulations of designs. In some embodiments, the score and yield information 140 are also provided as hints and constraints for the optimization 180 of future design 105. Score and yield information 140 are also used to more accurately determine hotspots, which is also used for optimization 180. One possible implementation of an optimization using hints and constraints as well as scores and yield information is described in detail in co-pending U.S. patent application Ser. No. 11/678, 594, entitled "System and Method for Layout Optimization Using Model-Based Verification," filed on Feb. 24, 2007, which is incorporated herein by reference in its entirety. In further embodiments, these filters are user-configurable.

In an embodiment, for a given process and design, for process-window optimization, and for sign-off applications, manufacturability analysis is performed on a stand-alone basis. In another embodiment, the report summarizes results for these three applications. In a further embodiment, reports 170 are stored in storage such as memory or hard drive to be given for the fabrication testers to assist in the determination of possible locations of hotspots.

Figure 2:
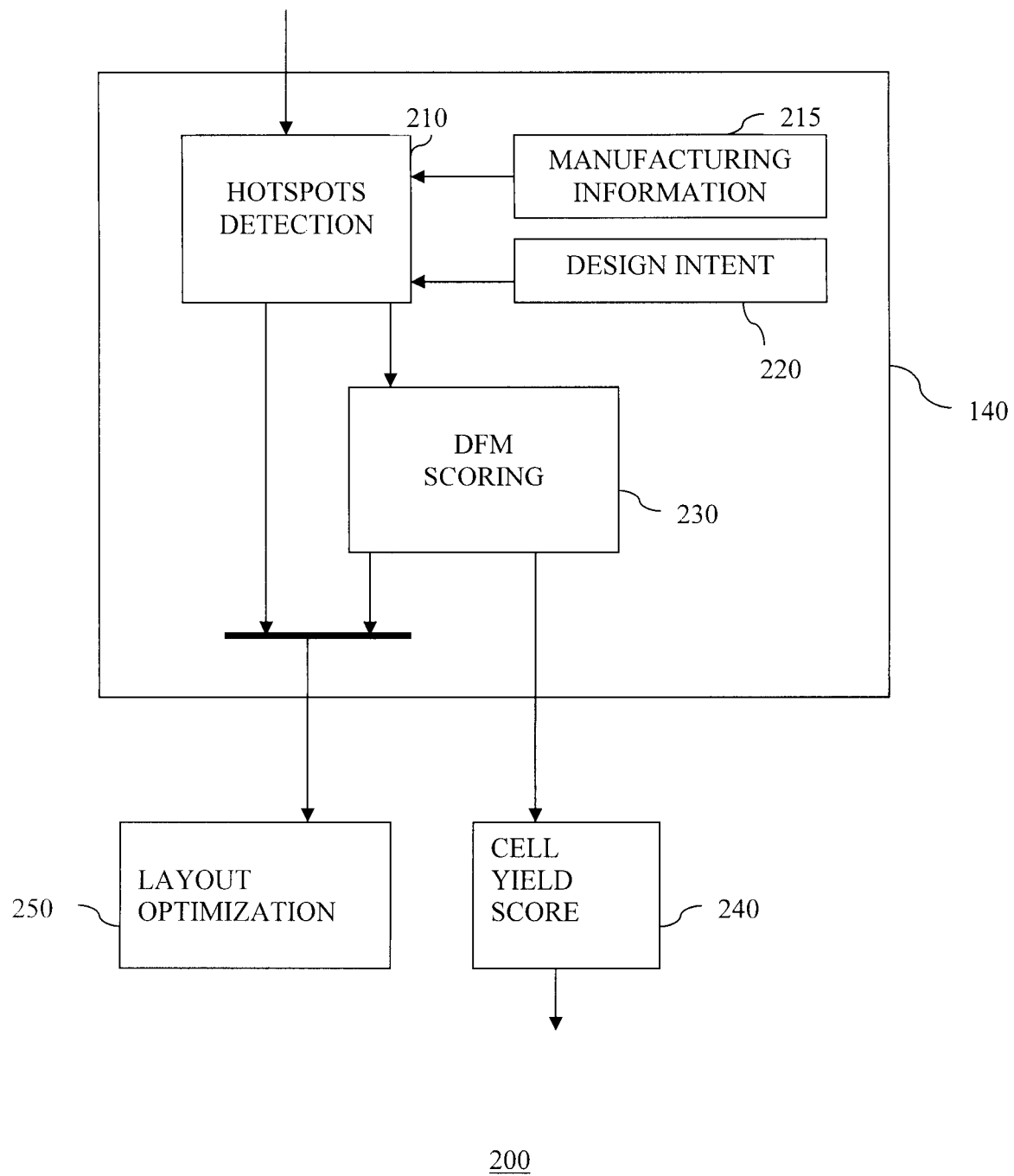
FIG. 2 depicts a block diagram of a scoring mechanism.

FIG. 2 depicts a block diagram of a scoring mechanism. Block 140 receives the layout design of model based simulated design. The mechanism 200 provides process information and scores. In an embodiment, the process information includes via failure rates, lithography and CMP model choices, random sized cell density, etc. In an embodiment, the scores include individual scores per cell, layer and physical effects. In another embodiment, the scores also include aggregated score per cell. In a further embodiment, the score also approximates limited yield and aggregated yield per cell.

The mechanism 200 includes the filter & scoring & yield 140 block, which provides output information for cell yield score 240 and layout optimization 250. The block 140 includes hotspot detection block 210, design for manufacturing (DFM) scoring block 230, manufacturing information 215 and design intent block 220.

Hotspot detection block 210 uses the model based simulation layout information with the manufacturing information 215 and design intent 220 to determine the locations of hotspots based on models. Manufacturing information 215 includes rule decks, models, etc. Design intent 220 includes information of the designer to the manufacturer that is not expressed in the layout design. For example, a logo on a wafer could be expressed to the manufacturer and hotspots in the logo area would not be optimized. An example of hotspot detection is illustrated in FIG. 3. In one approach, the model-based simulations are implemented as described in co-pending U.S. patent application Ser. No. 11/678,592, entitled "System and Method for Performing Verification Based Upon Both Rules and Models," filed on Feb. 24, 2007, which is incorporated herein by reference in its entirety.

DFM scoring block 230 determines the score of the determined hotspots 210. Scoring represents a quantitative estimate of expected loss for a given limited yield effect. The score may be related to a limited yield. The scores for hotspots are calculated as a function of a plurality of design and manufacturing factors including the processes at the fabrication plant and the layout design of the chip. The information to determine a score is provided by the manufacturer and/or designers, thus allowing the hotspots to be relatively ranked. In one embodiment, the score is either a pass or a fail with respect to a threshold such as a minimum yield determined by the manufacturer. In another embodiment, the score represents how likely the fabricated design at a hotspot will be operational. In an embodiment, the score is determined with the assistance of a graph similar to the example graph illustrated in FIG. 4. In another embodiment, test chips are used to determine the score. The score is used in combination with the detected hotspots to categorize and filter the detected hotspots so a manageable amount of hotspots are selected for optimization. In a further embodiment, the score represents the criticality of a hotspot. In another embodiment, a higher score means an area is more crucial to the chip having a higher yield.

The limited yields are determined utilizing the yield models. The yield models provide predictions of geometric variation as a function of layout pattern and process dependencies and, in some cases, wafer-level tool and pattern related process dependencies. Yield models provide predictions of yield effects 240. In an embodiment, yield models predict geometric variation as a function of layout-pattern and process dependencies. In another embodiment, yield models predict wafer-level tool and pattern related process dependencies. In a further embodiment, Copper and Tungsten CMP 45 nm technology models are used to predict interconnect thickness variation in metal levels. In other embodiments, lithography model for both interconnect and transistor related etch is used. In some embodiments, yield models are defined and computed for any number of effects as desired. For others, a scoring function is used that maps to the MBV input language and drives Scoring Utilities. The utilities (such as graphs and test chip information) then are used to define a qualitative estimate of yield loss.

Using the list of categorized hotspots, a cell yield score 240 is determined. The cell yield is a product of the parametric yields within a cell. Using the scoring of the hotspots, a yield score is extrapolated to show the likelihood of a functional design after manufacture. The detected hotspot 210 and scoring 230 are also used for layout optimization 250. One approach for categorizing hotspots and layout optimization using hits and constraints as well as scores and yield information is described in co-pending U.S. patent application Ser. No. 11/678,594, entitled "System and Method for Layout Optimization Using Model-Based Verification," filed on Feb. 24, 2007, which is incorporated herein by reference in its entirety. In further embodiments, these filters are user-configurable.

Figure 3A:
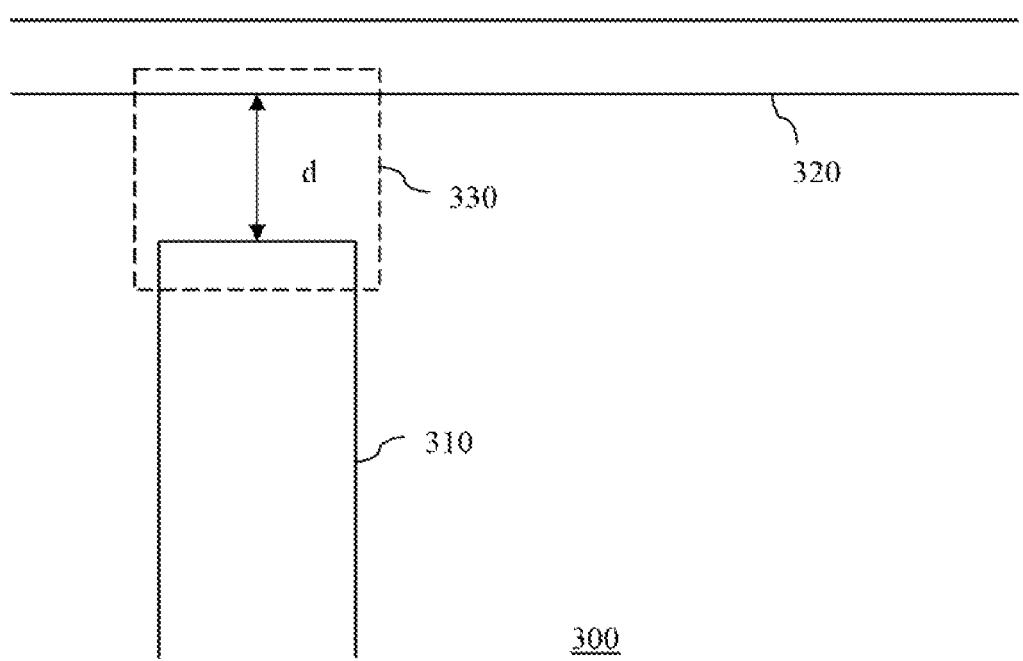
FIG. 3A illustrates a conventional layout design for determining hotspots.

FIG. 3*a* illustrates a conventional layout design for determining hotspots. Conventional rule-based approach is based on statistical analysis stating that the more conservative the design rules the greater the expected yield. For example, hotspot due to critical area shorts can be improved by spreading the wires farther apart to increase the expected yield. For example, for a design having two wires 310 and 320 separated by distance d. Because of the uncertainty in the manufacturing process, the area 330 is flagged as hotspot because to achieve a desired yield, d has to be at some minimum distance. Because of the uncertainty, the spacing d is more conservative than actually needed. Layout spacing is more efficiently used using the model-based approach as described below.

Figure 3B:
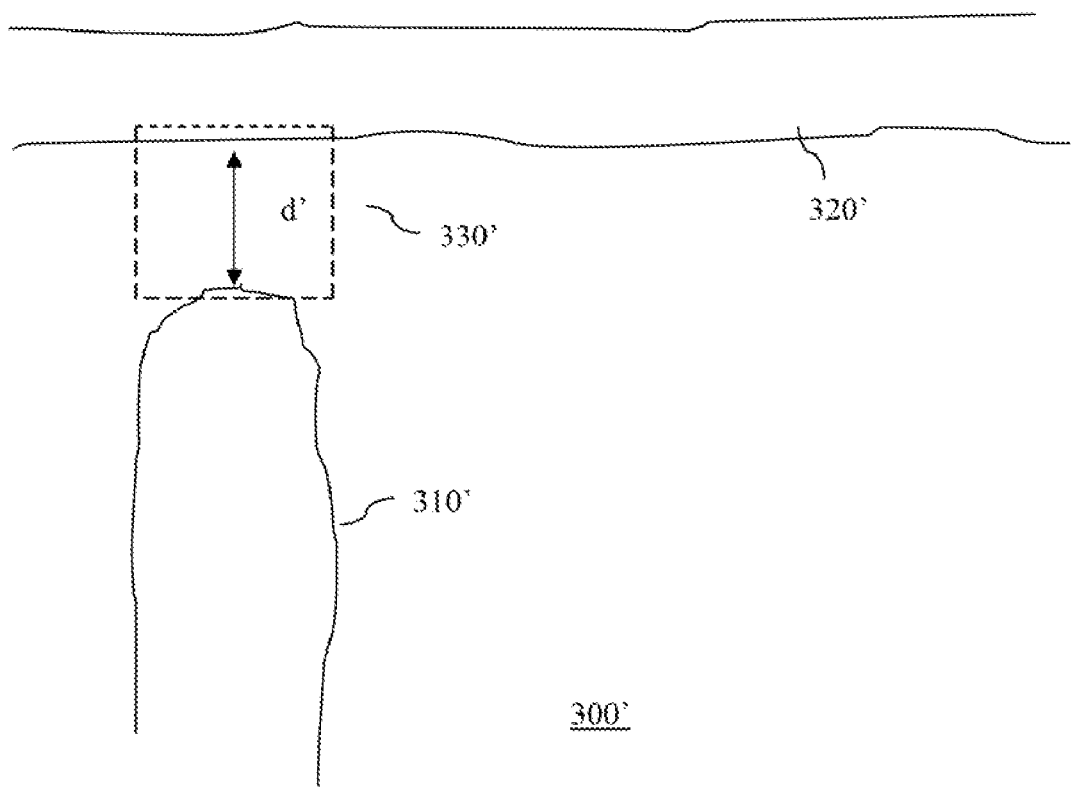
FIG. 3B illustrates a layout design for determining hotspots according to an embodiment of the present invention.

FIG. 3*b* illustrates a layout design for determining hotspots according to an embodiment of the present invention. In the model-based approach further the example above, the features represented by rectangles 310, 320 representing wires are simulated by the MBV tools using DFM information to predict the as-manufactured feature shapes 310' and 320' of the fabricated wires. By knowing a more accurate picture of the as-manufactured product features, improved detection of hotspot 330' is determined and spacing d' can be less conservative. Spacing d' requires less buffer zone because the distance between the wires better represents the actual as-manufactured product features. Therefore, the simulation allows for a reduced d' for more efficient use of layout space in the design.

Figure 4:
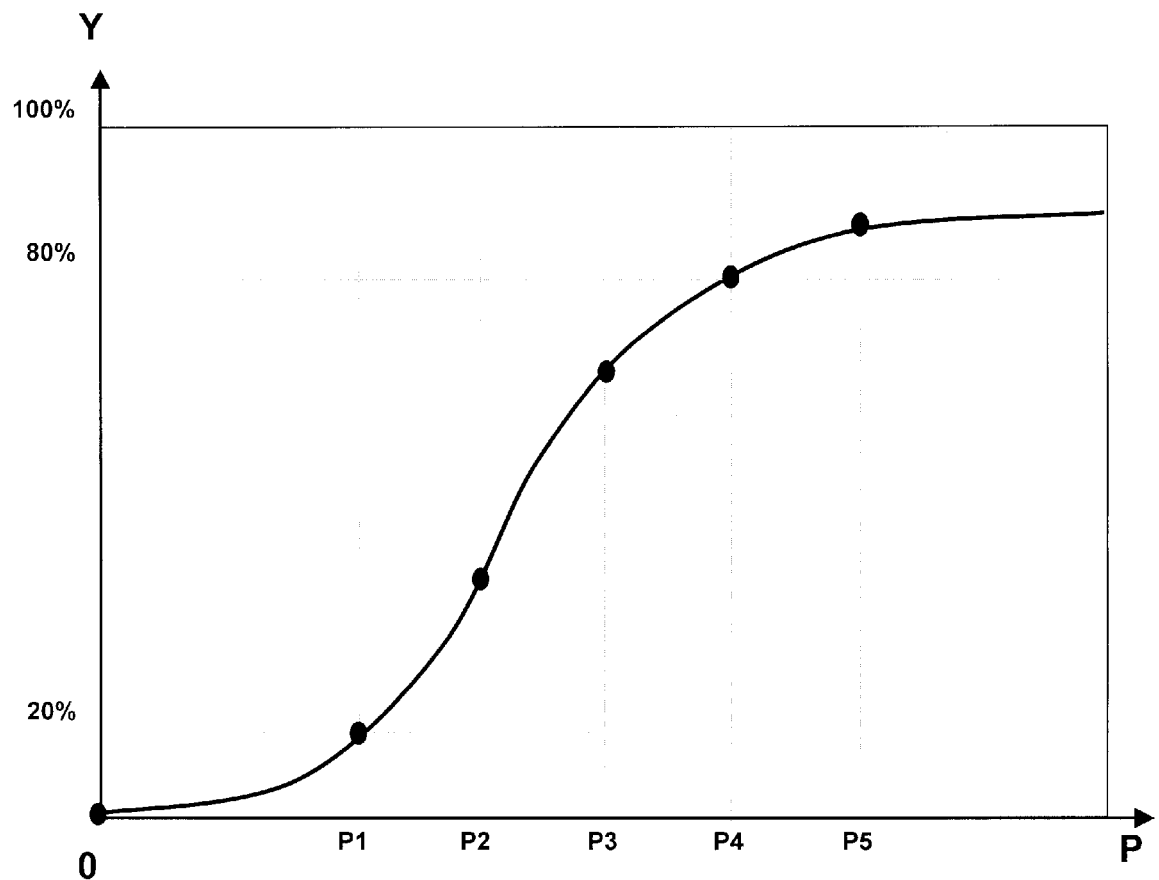
FIG. 4 illustrates a graph representing the relationship between the parametric score and the yield.

FIG. 4 illustrates a graph representing the relationship between the parameters and the yield. The graph has parameters on the X-axis and yield percentages on the Y-axis.

Parameters for a design include spacing, pattern replacing, etc. Each parameter has associated with it rules. For example, lithography has rules for edge distance requirements. Depending on the value of the distance, the yield rate varies due to lithography. Using prior knowledge of the yield with respect to certain parameters, a curve is extrapolated. Depending on how conservative the parametric value used, a final yield percentage is determined based on a curve. In an embodiment, the curve is estimated using results from the test chip. In another embodiment, the curve is simulated and calculated to predict the parametric effect on yield. Any curve can be used for predicting future yield in current layout designs. Manufacturers use this type of curve to analyze the cost/profit of fabrication. Some manufactures may suggest using rule decks to ensure a certain yield. A product of the parametric yields is the final product yield of the design.

Information from this curve can be used to prioritize hotspots. In some embodiments, buckets are selected. In an embodiment, buckets are ranges of parametric values have a specific related range of yield values. In another embodiment, the designers can prioritize to selectively improve hotspots having low yield. In another embodiment, buckets having low yields can be automatically improved while higher yield buckets can be selectively improved by the designers. Other categorization methods are possible. For example, a bucket having parametric values between P1 and P2 means the hotspot has a high priority to be optimized. On the other hand, a bucket having parametric values between P4 and P5 means the hotspots associated with that section are optional for optimizing. One approach for categorizing hotspots and layout optimization using scores and yield information is described in detail in co-pending U.S. patent application Ser. No. 11/678,594, entitled "System and Method for Layout Optimization Using Model-Based Verification," filed on Feb. 24, 2007, which is incorporated herein by reference in its entirety.

Figure 5:
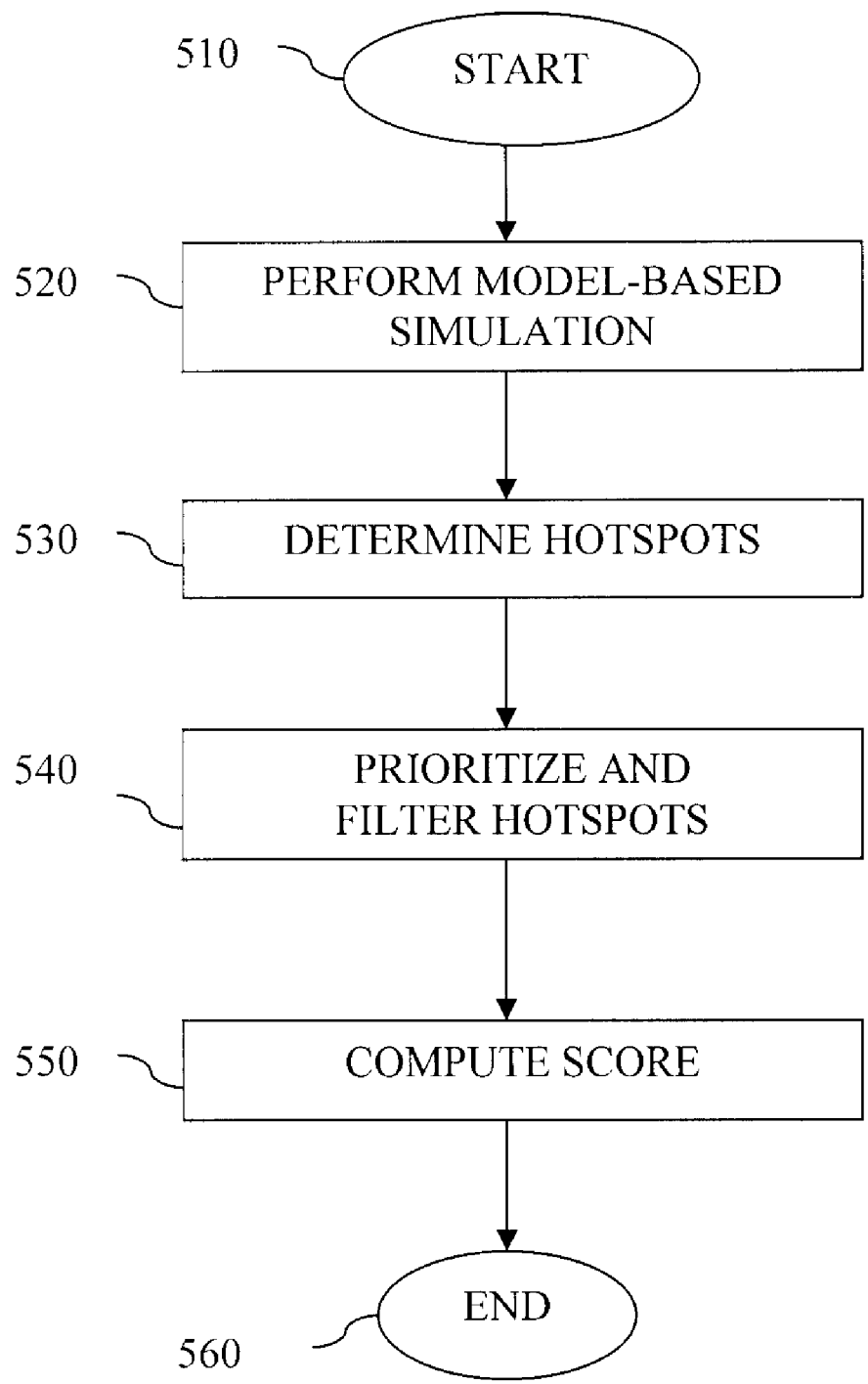
FIG. 5 illustrates a flow diagram of a method for scoring determination.

FIG. 5 illustrates a flow diagram 500 of a method for scoring determination.

At 510, the method starts, and the designer provides the design and the manufacturer provides process and model information.

At 520, model-based simulation is performed. The simulations of the models of the layout represent a more accurate representation of the final as-manufactured product. This information is provided and associated with design rules. One approach implements the simulation process according to some embodiments as described in co-pending U.S. patent application Ser. No. 11/678,592, entitled "System and Method for Performing Verification Based Upon Both Rules and Models," filed on Feb. 24, 2007, which is incorporated herein by reference in its entirety.

At 530, hotspots are determined using the rules and the simulations of the models. One possible implementation for the determination of hotspots is described in FIG. 3 above and in co-pending U.S. patent application Ser. No. 11/678,592, entitled "System and Method for Performing Verification Based Upon Both Rules and Models," filed on Feb. 24, 2007, which is incorporated herein by reference in its entirety.

At 540, the hotspots are prioritized and filtered. In one embodiment, the spacing and hotspots are calculated. In another embodiment, buckets are used to categorize hotspots according to the yield predictions. The hotspots are categorized and ranked. The list of ranked hotspots are provided and stored. It may be desirable to reduce the number of hotspots to a more manageable number, so the list of hotspots is filtered. In some embodiments, the filter takes the categorized hotspots and selects according to a priority for the hotspots according to their criticality to the yield of the design. In other embodiments, only the hotspots that are highly ranked (i.e., cause problems) are filtered to be provided to be optimized. In further embodiments, hotspots are filtered to be automatically optimized or optionally provided to the user for optimizing only certain hotspots as desired. In other embodiments, the filter is designed to pass certain hotspots as desired by the user.

At 550, the hotspots and yield graph are used to compute a score for the hotspots. A graph is determined using information from the manufacturer and information related to the design intent. In one embodiment, a test chip is provided to assist in determining the relationships to obtain the graph. In another embodiment, the parameters and process information is directly provided to the designer to calculate the graph from simulations. This graph is used for further testing and optimization of the layout design by assisting the generation of the score for the simulated hotspots. In a further embodiment, a score is generated as a function using information from the manufacturer and the design intent with the relative priority and yield information of the hotspots. In one embodiment, a yield having a certain score represents a high priority for optimization. In another embodiment, a score also includes hints on suggestions to improve the design at the hotspot.

At 560, the score is stored and/or provided, and the process ends.

Figure 6:
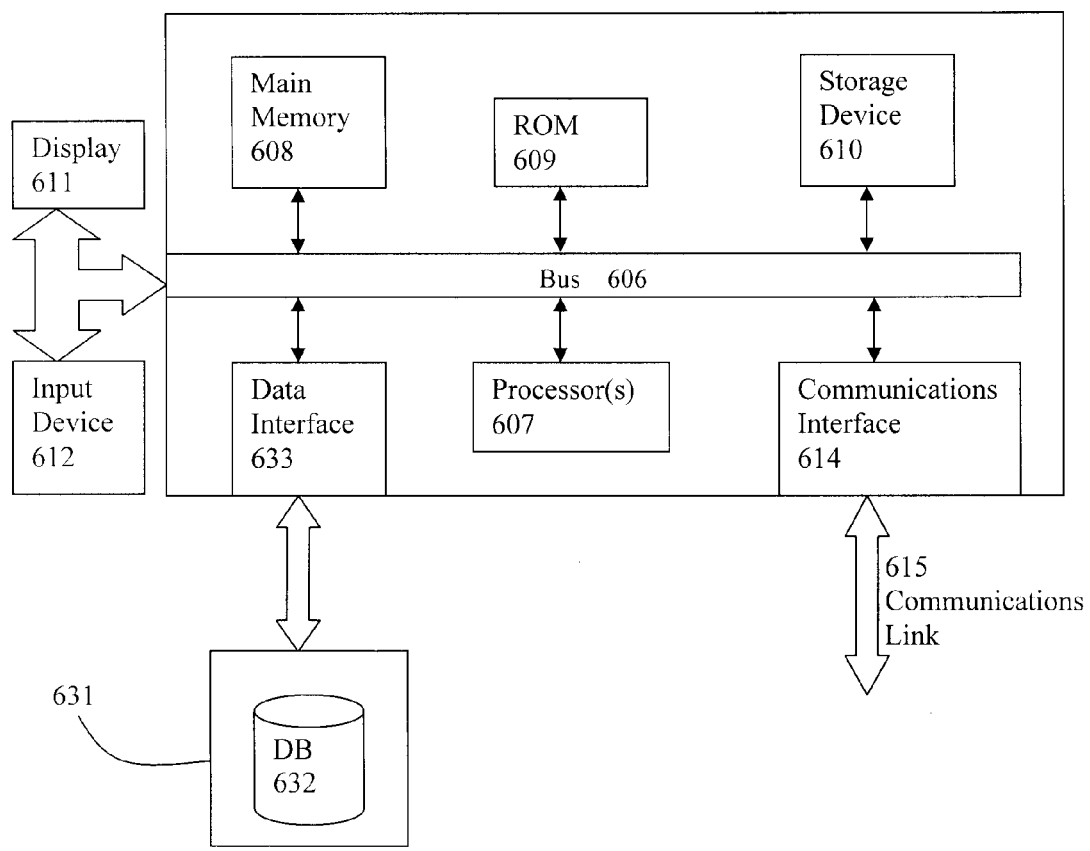
FIG. 6 depicts a computerized system on which a method for verification based on rules and models can be implemented.

FIG. 6 depicts a computerized system on which a method for verification based on rules and models can be implemented.

The execution of the sequences of instructions required to practice the embodiments may be performed by a computer system 600 as shown in FIG. 6. In an embodiment, execution of the sequences of instructions is performed by a single computer system 600. According to other embodiments, two or more computer systems 600 coupled by a communication link 615 may perform the sequence of instructions in coordination with one another. Although a description of only one computer system 600 will be presented below, however, it should be understood that any number of computer systems 600 may be employed to practice the embodiments.

A computer system 600 according to an embodiment will now be described with reference to FIG. 6, which is a block diagram of the functional components of a computer system 600. As used herein, the term computer system 600 is broadly used to describe any computing device that can store and independently run one or more programs.

Each computer system 600 may include a communication interface 614 coupled to the bus 606. The communication interface 614 provides two-way communication between computer systems 600. The communication interface 614 of a respective computer system 600 transmits and receives electrical, electromagnetic or optical signals, which include data streams representing various types of signal information, e.g., instructions, messages and data. A communication link 615 links one computer system 600 with another computer system 600. For example, the communication link 615 may be a LAN, in which case the communication interface 614 may be a LAN card, or the communication link 615 may be a PSTN, in which case the communication interface 614 may be an integrated services digital network (ISDN) card or a modem, or the communication link 615 may be the Internet, in which case the communication interface 614 may be a dial-up, cable or wireless modem.

A computer system 600 may transmit and receive messages, data, and instructions, including program, i.e., application, code, through its respective communication link 615 and communication interface 614. Received program code may be executed by the respective processor(s) 607 as it is received, and/or stored in the storage device 610, or other associated non-volatile media, for later execution.

In an embodiment, the computer system 600 operates in conjunction with a data storage system 631, e.g., a data storage system 631 that contain a database 632 that is readily accessible by the computer system 600. The computer system 600 communicates with the data storage system 631 through a data interface 633. A data interface 633, which is coupled to the bus 606, transmits and receives electrical, electromagnetic or optical signals, which include data streams representing various types of signal information, e.g., instructions, messages and data. In embodiments, the functions of the data interface 633 may be performed by the communication interface 614.

Computer system 600 includes a bus 606 or other communication mechanism for communicating instructions, messages and data, collectively, information, and one or more processors 607 coupled with the bus 606 for processing information. Computer system 600 also includes a main memory 608, such as a random access memory (RAM) or other dynamic storage device, coupled to the bus 606 for storing dynamic data and instructions to be executed by the processor(s) 607. The main memory 608 also may be used for storing temporary data, i.e., variables, or other intermediate information during execution of instructions by the processor(s) 607.

The computer system 600 may further include a read only memory (ROM) 609 or other static storage device coupled to the bus 606 for storing static data and instructions for the processor(s) 607. A storage device 610, such as a magnetic disk or optical disk, may also be provided and coupled to the bus 606 for storing data and instructions for the processor(s) 607.

A computer system 600 may be coupled via the bus 606 to a display device 611, such as, but not limited to, a cathode ray tube (CRT), for displaying information to a user. An input device 612, e.g., alphanumeric and other keys, is coupled to the bus 606 for communicating information and command selections to the processor(s) 607.

According to one embodiment, an individual computer system 600 performs specific operations by their respective processor(s) 607 executing one or more sequences of one or more instructions contained in the main memory 608. Such instructions may be read into the main memory 608 from another computer-usable medium, such as the ROM 609 or the storage device 610. Execution of the sequences of instructions contained in the main memory 608 causes the processor(s) 607 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 607. Such a medium may take many forms, including, but not limited to, non-volatile and volatile and transmission media. Non-volatile media, i.e., media that can retain information in the absence of power, includes the ROM 609, CD ROM, magnetic tape, and magnetic discs. Volatile media, i.e., media that can not retain information in the absence of power, includes the main memory 608.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than in a restrictive sense.

What is claimed is:

1. A computer implemented method for model-based yield prediction, comprising:
    using a processor configured for performing:
        predicting a physical realization of a layout design based at least in part on one or more model parameters;
        determining one or more hotspots associated with the layout design;
        determining a score for each of the one or more hotspots based at least in part on a yield information;
        categorizing the one or more hotspots according to at least the score; and
    using a computer readable storage medium or a computer storage device configured for storing at least the score or using a display apparatus configured for displaying at least the score.

2. The method of claim 1, further comprising using model based simulation to predict yield.

3. The method of claim 1, wherein the score is also based on models and design rules.

4. The method of claim 1, wherein a cell yield is determined based at least in part on the hotspots that are categorized.

5. The method of claim 4, wherein the score represents a likelihood of a functional design after manufacture.

6. The method of claim 5, wherein the score represent a priority for optimization.

7. The method of claim 4, wherein the cell yield is a product of parametric yields within the cell.

8. The method of claim 1, wherein the score is calculated as a function using information from a manufacturer and a design intent with a relative priority and yield information of the hotspots.

9. The method of claim 1, wherein the score for at least one of the hotspots is based at least in part on parametric information.

10. The method of claim 1, further comprising including hints on suggestions to improve the design at the hotspot.

11. A computer system for predicting model-based yield comprising:
    a processor configured for performing:
        predicting a physical realization of a layout design based at least in part on one or more model parameters;
        determining one or more hotspots associated with the layout design;
        calculating a score for each of the one or more hotspots based at least in part on a predicted yield; and
    categorize the one or more hotspots according to at least the score.

12. The system of claim 11, wherein the yield is predicted using model based simulation.

13. The system of claim 11, wherein a cell yield is determined based at least in part on the hotspots that are categorized.

14. The system of claim 11, wherein the score is generated as a function using information from a manufacturer and a design intent with a relative priority and yield information of the hotspots.

15. The system of claim 11, wherein the score for at least one of the hotspots is based at least in part on parametric information.

16. The system of claim 11, wherein the score includes one or more hints on suggestions to improve the design at the at least one of the hotspots.

17. A computer program product embodied in a tangible computer readable storage medium having executable code which, when executed by a processor, causes the processor to execute a process for model-based yield prediction, the process comprising:

using a processor configured for performing:

predicting a physical realization of a layout design based at least in part on one or more model parameters;

determining one or more hotspots associated with the layout design;

calculating a score for each of the one or more hotspots based at least in part on a predicted yield; and categorize the one or more hotspots according to at least the score.

18. The product of claim 17, further comprising using model based simulation to predict yield.

19. The product of claim 17, wherein the score is calculated as a function using information from a manufacturer and a design intent with a relative priority and yield information of the hotspots.

20. The product of claim 17, wherein the score for at least one of the hotspots is based at least in part on parametric information.

\* \* \* \* \*